United States Patent
Luo et al.

(10) Patent No.: US 10,620,677 B2
(45) Date of Patent: Apr. 14, 2020

(54) AUTONOMOUS POWER SYSTEM AND ASSOCIATED CONTROL METHOD

(71) Applicant: Chengdu Monolithic Power Systems Co., Ltd., Chengdu (CN)

(72) Inventors: Reagan Luo, Hangzhou (CN); Qian Ouyang, Hangzhou (CN); Lijie Jiang, Hangzhou (CN); Marvin Ma, Hangzhou (CN); Xiaokang Wu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 293 days.

(21) Appl. No.: 15/842,797

(22) Filed: Dec. 14, 2017

(65) Prior Publication Data

US 2018/0173286 A1 Jun. 21, 2018

(30) Foreign Application Priority Data

Dec. 20, 2016 (CN) .......................... 2016 1 1186304

(51) Int. Cl.
*G06F 1/26* (2006.01)
*G06F 1/28* (2006.01)

(52) U.S. Cl.
CPC ................ *G06F 1/266* (2013.01); *G06F 1/26* (2013.01); *G06F 1/28* (2013.01)

(58) Field of Classification Search
CPC ............... G06F 1/26; G06F 1/28; G06F 1/266
See application file for complete search history.

(56) References Cited

U.S. PATENT DOCUMENTS

| | | | | |
|---|---|---|---|---|
| 2010/0153754 A1* | 6/2010 | Chiu | ........................ | G06F 1/26 713/300 |
| 2013/0086396 A1* | 4/2013 | Liu | ........................ | G06F 1/26 713/300 |
| 2013/0257399 A1 | 10/2013 | Jiang | | |
| 2013/0307503 A1 | 11/2013 | Ouyang | | |
| 2014/0002047 A1* | 1/2014 | Houston | ............... | H02M 3/156 323/283 |
| 2014/0032942 A1* | 1/2014 | Takehara | .............. | H02M 3/156 713/300 |
| 2014/0129851 A1* | 5/2014 | Hung | ........................ | G06F 1/26 713/300 |
| 2016/0239061 A1* | 8/2016 | Chen | ...................... | G06F 1/3234 |

* cited by examiner

*Primary Examiner* — Jaweed A Abbaszadeh
*Assistant Examiner* — Gayathri Sampath
(74) *Attorney, Agent, or Firm* — Perkins Coie LLP (57) ABSTRACT

An autonomous power system has a voltage regulator which converts an input voltage to an output voltage according to a reference voltage. A control method for the power system: receiving a voltage identification code sent by a processor; providing an autonomous voltage identification code when the voltage identification sent by the processor keeps constant during a first preset duration, wherein the autonomous voltage identification code can be updated self-adaptively; providing a reference voltage according to a sum of the voltage identification code and the autonomous identification code; and adjusting the output voltage according to the reference voltage.

15 Claims, 6 Drawing Sheets

AUTONOMOUS POWER SYSTEM AND ASSOCIATED CONTROL METHOD

This application claims the benefit of CN application No. 201611186304.7, filed on Dec. 20, 2016, and incorporated herein by reference.

TECHNICAL FIELD

The present invention relates to electrical circuit, more particularly but not exclusively relates to an autonomous power system and associated control method.

BACKGROUND

In a computer system, working voltage of a Central Processing Unit (CPU) is configured to vary with its working mode, and a voltage regulator is configured to provide an output voltage to power the CPU. In order to meet the demand for the output voltage at different working modes of the CPU, the voltage regulator is configured to receive a voltage identification code sent by the CPU and is configured to modulate the output voltage according to the voltage identification code.

Figure 1:
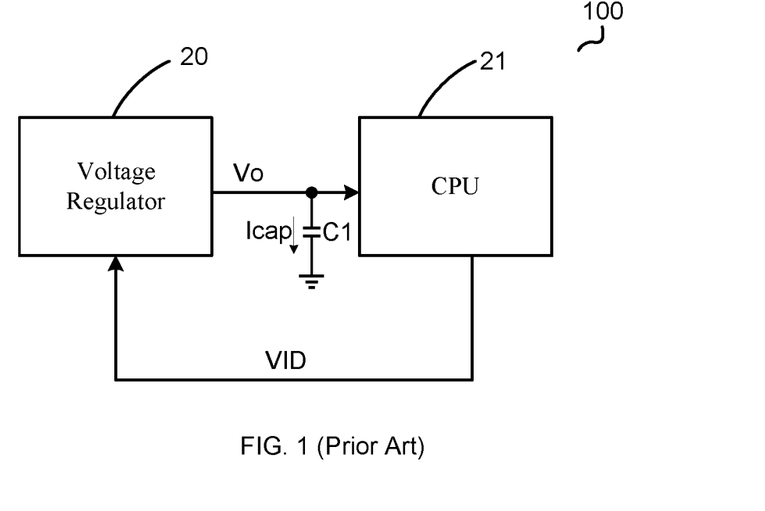
FIG. 1 schematically illustrates a circuit block diagram 100 of a traditional power system for the CPU according to an embodiment of the present invention.

FIG. 1 illustrates a circuit block diagram 100 of a traditional power system for the CPU. The CPU 21 is configured to send a voltage identification code VID to the voltage regulator 20, the voltage regulator 20 is configured to provide an output voltage Vo for a capacitor C1 according to the voltage identification code VID, and the output voltage Vo is the working voltage of the CPU 21. However, a variation period of the voltage identification code VID is uncontrollable, so a variation period of a current Icap flowing through the capacitor C1 may enter into an audible range, so the power system may produce audible noises.

SUMMARY

It is one of the objects of the present invention to provide an autonomous power system and associated control method.

One embodiment of the present invention discloses a control method for a power system, wherein the power system comprises a voltage regulator, the voltage regulator is configured to convert an input voltage to an output voltage, the control method comprising: receiving a voltage identification code sent by a processor; providing an autonomous voltage identification code according to the voltage identification code sent by the processor, and updating the autonomous voltage identification code when the voltage identification code sent by the processor keeps constant during a first preset duration; providing a reference voltage according to both the voltage identification code and the autonomous voltage identification code; and adjusting the output voltage according to the reference voltage.

Another embodiment of the present invention discloses a power system, comprising: a reference voltage generating circuit, configured to receive a voltage identification code sent by a processor, and configured to generate an autonomous voltage identification code according to the voltage identification code sent by the processor, the reference voltage generating circuit is configured to provide a reference voltage according to a sum of the voltage identification code and the autonomous voltage identification code; and a voltage regulator, coupled to the reference voltage generating circuit to receive the reference voltage and to convert an input voltage to an output voltage; wherein the autonomous voltage identification code is configured to be updated when the voltage identification code keeps constant during a first preset duration.

Yet another embodiment of the present invention discloses a control method for a power system, wherein the power system comprises a voltage regulator configured to convert an input voltage to an output voltage according to a reference voltage, the control method comprising: receiving a voltage identification code sent by a processor; providing an autonomous voltage identification code, wherein the autonomous voltage identification code is configured to be altered when the voltage identification code sent by the processor keeps constant during a preset duration; providing the reference voltage according to a sum of the voltage identification code and the autonomous voltage identification code; and adjusting the output voltage according to the reference voltage.

According to the embodiments of the present invention, the power system can provide an autonomous voltage identification code, so the power system can eliminate the audible noise, wherein the noise at voice frequency is generated in the capacitor by the power system.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are described to provide a thorough understanding of the present invention, such as examples of circuits, components, and methods. These embodiments illustrated are exemplary, not to confine the scope of the invention. A person ordinary skilled in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

In the present application, an autonomous power system is configured to self-adaptively generate an autonomous voltage identification code VID2 according to the voltage identification code VID, wherein the voltage identification code VID is sent by a CPU. And the autonomous power system is configured to provide a reference voltage according to both the voltage identification code VID and the autonomous voltage identification code VID2, thus adjusting an output voltage according to the reference voltage, wherein the output voltage is generated by the autonomous power system.

Figure 2:
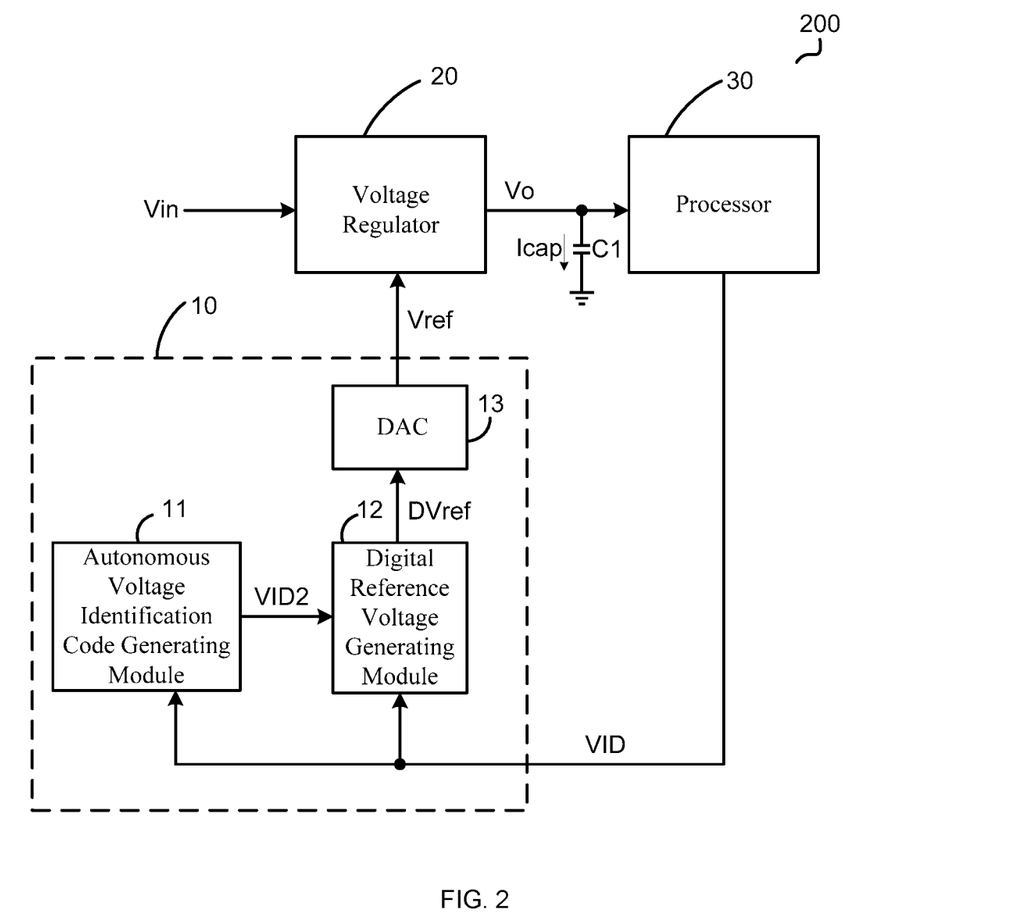
FIG. 2 schematically illustrates a circuit block diagram of an autonomous power system 200 according to an embodiment of the present invention.

FIG. 2 schematically illustrates a circuit block diagram of an autonomous power system 200 according to an embodiment of the present invention. The autonomous power system 200 comprises a reference voltage generating circuit 10 and a voltage regulator 20. The reference voltage generating circuit 10 is configured to receive the voltage identification code VID from a processor 30, and configured to provide a reference voltage Vref according to the voltage identification code VID. In one embodiment, the reference voltage generating circuit 10 can receive the voltage identification code VID from the processor 30 via serial communication or parallel communication. In one embodiment, the processor 30 can be a CPU, a GPU (Graphics Processing Unit) or other kinds of signal processors. The voltage regulator 20 is coupled to the reference voltage generating circuit 10 to receive the reference voltage Vref, and configured to convert an input voltage Vin to an output voltage Vo according to the reference voltage Vref. In one embodiment, the voltage regulator 20 comprises a switching circuit and a control circuit, wherein the switching circuit comprises at least one power switch, the control circuit is configured to provide a switching control signal to control the power switch in the switching circuit according to the reference voltage Vref and the output voltage Vo.

The reference voltage generating circuit 10 is configured to generate an autonomous voltage identification code VID2 according to the voltage identification code VID sent by the processor 30, and is configured to provide the reference voltage Vref according to a sum of the voltage identification code VID and the autonomous voltage identification code VID2. In the embodiment as shown in FIG. 2, the reference voltage generating circuit 10 comprises an autonomous voltage identification code generating module 11, a digital reference voltage generating module 12 and a Digital-to-Analog Converter (DAC) 13. The autonomous voltage identification code generating module 11 is configured to receive the voltage identification code VID and provide the autonomous voltage identification code VID2 according to the voltage identification code VID. The digital reference generating module 12 is configured to receive the voltage identification code VID and the autonomous identification code VID2, and the digital reference generating module 12 is configured to generate a digital reference voltage signal DVref according to both the voltage identification code VID and the autonomous identification code VID2. In one embodiment, the digital reference voltage generating module 12 is configured to generate the digital reference signal DVref according to the sum of the voltage identification code VID and the autonomous voltage identification code VID2. The Digital-to-Analog Converter (DAC) 13 is configured to convert the digital reference voltage signal DVref to an analog signal, wherein the analog signal is configured to be the reference voltage Vref. In one embodiment, the digital reference voltage generating module 12 is configured to provide the digital reference voltage signal DVref according to the voltage identification code VID when the voltage identification code VID sent by the processor 30 is updated, for example, DVref=VID; the digital reference voltage generating module 12 is configured to provide the digital reference voltage DVref according to the voltage identification code VID and the autonomous voltage identification code VID2 when the voltage identification code VID sent by the processor 30 is constant and the autonomous voltage identification code VID2 is configured to be updated, for example, DVref=VID+VID2.

The autonomous power system 200 is configured to generate the autonomous identification code VID2 self-adaptively, the power system can self-adaptively decrease the variation period of the output voltage Vo provided by the voltage regulator 20 if the variation period of the voltage identification code VID sent by the processor 30 is too long, thus avoiding the variation period of the current Icap of the capacitor C1 from increasing to be in the audible range.

Figure 3:
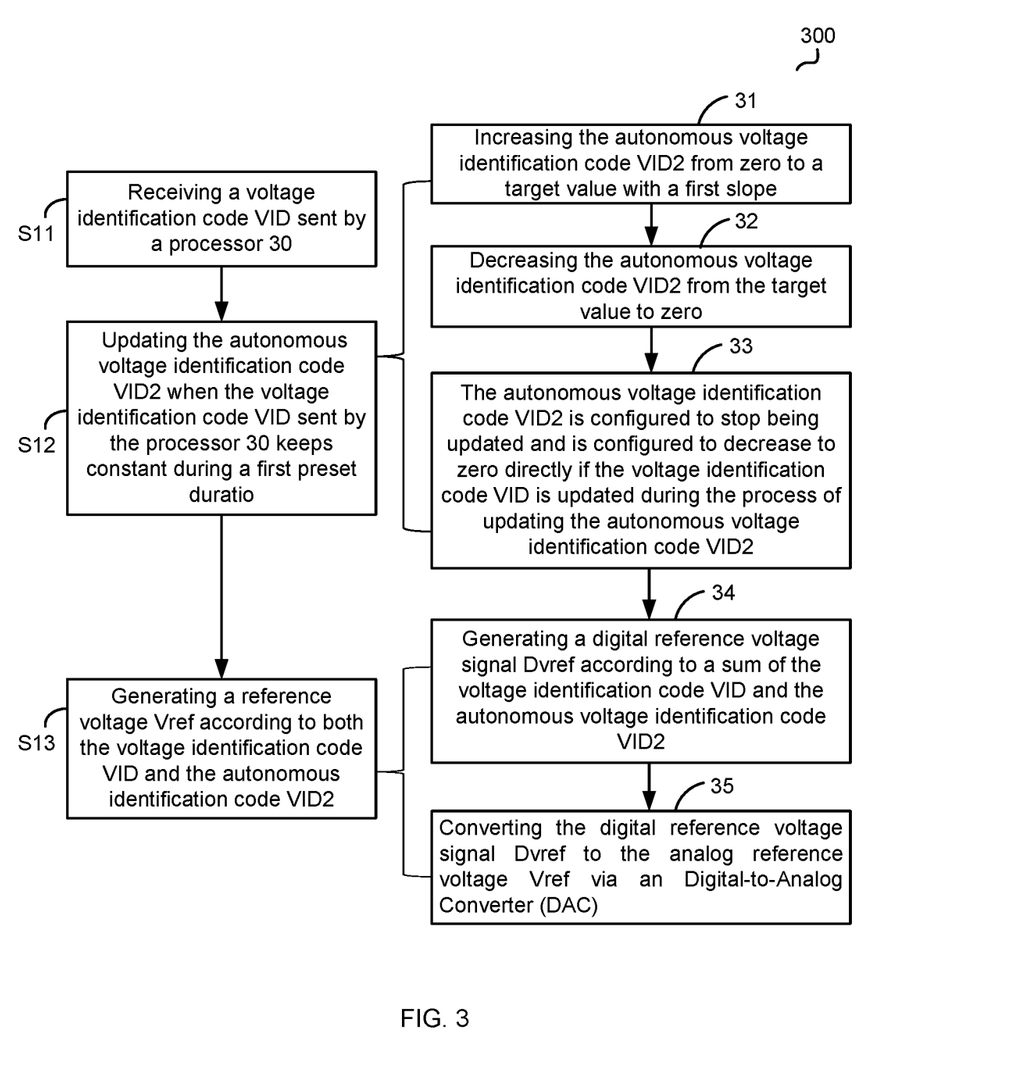
FIG. 3 shows a flow chart illustrating a process that a reference voltage generating circuit 10 shown in FIG. 2 is configured to generate a reference voltage based on a voltage identification code sent by the CPU according to an embodiment of the present invention.

FIG. 3 shows a flow chart illustrating a process that the reference voltage generating circuit 10 shown in FIG. 2 is configured to generate a reference voltage based on a voltage identification code sent by the CPU according to an embodiment of the present invention. The process comprises steps S11-S13.

At step S11, the reference voltage generating circuit 10 is configured to receive the voltage identification code VID sent by the processor 30.

At step S12, the autonomous voltage identification VID2 is configured to be updated if the voltage identification code VID keeps constant during a first preset duration. In one embodiment, the initial value of the autonomous voltage identification code VID2 is zero, updating the autonomous voltage identification code VID2 means providing a changed autonomous voltage identification code VID2. As a person ordinarily skilled in the art knows, updating the voltage identification code VID means the voltage identification code VID is changed; no updates will happen if the voltage identification code VID is constant. Similarly, as a person of ordinary skill in the art knows, updating the autonomous voltage identification code VID2 means the autonomous voltage identification code VID2 is changed; no updates will happen if the autonomous voltage identification code VID2 is constant. In one embodiment, updating the autonomous voltage identification code VID2 comprises steps 31-33. At step 31, increasing the autonomous voltage identification code VID2 from zero to a target value with a first slope. At step 32, decreasing the autonomous voltage from the target value to zero with a second slope. In one embodiment, the first slope is equal to the second slope. In one embodiment, the first slope, the second slope and the target value are adjustable; for example, updating duration of the autonomous voltage identification code VID2 can be controlled to be equal or less than a second preset duration in order to complete updating the autonomous identification code VID2 during the second preset duration. In one embodiment, a sum of the first preset duration and the second preset duration is less than 50 us. At step 33, the autonomous voltage identification code VID2 is configured to stop updating and is configured to decrease to zero directly if the voltage identification code VID is updated during the updating of the autonomous voltage identification code VID2.

At step S13, generating a reference voltage Vref according to both the voltage identification code VID and the autonomous voltage identification code VID2. In one embodiment, the process of generating the reference voltage Vref according to both the voltage identification code VID and the autonomous voltage identification code VID2 comprises: generating the reference voltage Vref according to the sum of the voltage identification code VID and the autonomous voltage identification code VID2. In the embodiment as shown in FIG. 3, process of generating the reference voltage Vref according to both the voltage identification code VID and the autonomous voltage identification code VID2 comprises steps 34-35. At step 34, providing a digital reference voltage signal DVref according to the sum of the voltage identification code VID and the autonomous identification code VID2. At step 35, converting the digital reference voltage signal DVref to an analog signal, i.e. the reference voltage Vref.

Figure 4:
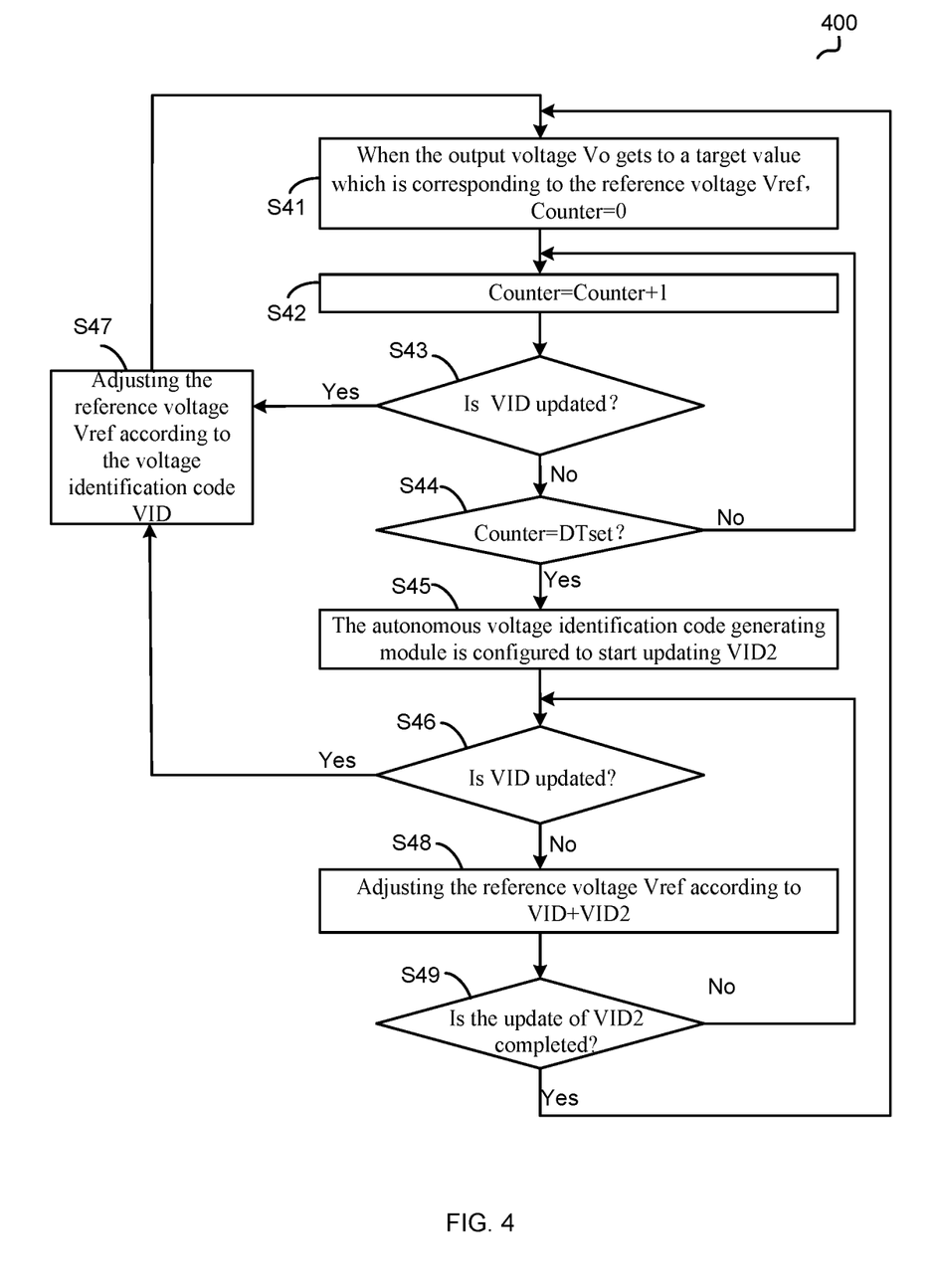
FIG. 4 shows a flow chart illustrating a control method for the autonomous power system 200 shown in FIG. 2 according to another embodiment of the present invention.

FIG. 4 shows a flow chart illustrating a control method for the autonomous power system 200 shown in FIG. 2 according to another embodiment of the present invention. The control method shown in FIG. 4 comprises steps S41-S49.

At step S41, a timer is configured to be reset when the output voltage Vo equals to the target value of the reference voltage Vref, a timer value Counter is equal to 0. In one embodiment, the output voltage Vo reaching the target value of the reference voltage Vref comprises: the output voltage Vo comes into a preset range of the reference voltage Vref. For example, the output voltage Vo is regarded as a voltage in the preset range of the reference voltage Vref if the output voltage Vo is larger than a threshold voltage Vth1 and smaller than a threshold voltage Vth2. Wherein the threshold voltage Vth1 is smaller than the target value of the reference voltage Vref, and the threshold voltage Vth2 is larger than the target value of the reference voltage Vref. For another example, the output voltage Vo is regarded as a value in the preset range of the reference voltage Vref if the output voltage Vo is larger than the threshold voltage Vth1. Besides, the output voltage Vo is regarded as a value in the preset range of the reference voltage Vref if the output voltage Vo is smaller than the threshold voltage Vth2. In another embodiment, the output voltage Vo reaching the target value of the reference voltage Vref comprises: the output voltage Vo is equal to the target value of the reference voltage Vref.

At step S42, when the timer is configured to start recording the time, the timer value Counter is configured to increase, for example, Counter=Counter+1.

At step S43, judging whether the voltage identification code VID is updated or not. If the voltage identification code sent by the processor 30 is updated, then turns back to step S41 via S47. If the voltage identification code VID sent by the processor is not updated, then turns forward to step S44, judging whether the timer value Counter is equal to a preset value DTset or not, wherein the preset value DTset is corresponding to the first preset duration Tset. When the timer value Counter is not equal to the preset value DTset, then turns back to step S42, and the timer value Counter is configured to continue increasing. When the timer value Counter is equal to the preset value DTset and the recorded time equals to the first preset duration Tset, then turns forward to step S45.

At step S45, the autonomous voltage identification generating module 11 is configured to start updating the autonomous identification code VID2.

At step S46, judging whether the voltage identification code VID sent by the processor 30 is updated or not. If the voltage identification code VID sent by the processor 30 is updated, then turns back to step S41 via step S47. If the identification code VID sent by the processor 30 is not updated, then turns forward to step S48.

At step S47, adjusting the reference voltage Vref according to the voltage identification code VID sent by the processor 30.

At step S48, adjusting the reference voltage Vref according to the sum VID+VID2 of the voltage identification code VID and the autonomous voltage identification code VID2.

At step S49, judging whether the updating of autonomous identification code VID2 is completed or not. If the updating of the autonomous identification code VID2 is completed, then turns back to S41; otherwise, turns back to step 46. In one embodiment, completing updating the autonomous identification code VID2 comprises: the autonomous voltage identification code VID2 is configured to decrease to zero.

Note that in the flow chart described above, the box functions may also be implemented with different orders as shown in FIG. 4. For example, two successive box functions may be executed meanwhile, or sometimes the box functions may be executed in reverse order.

Figure 5:
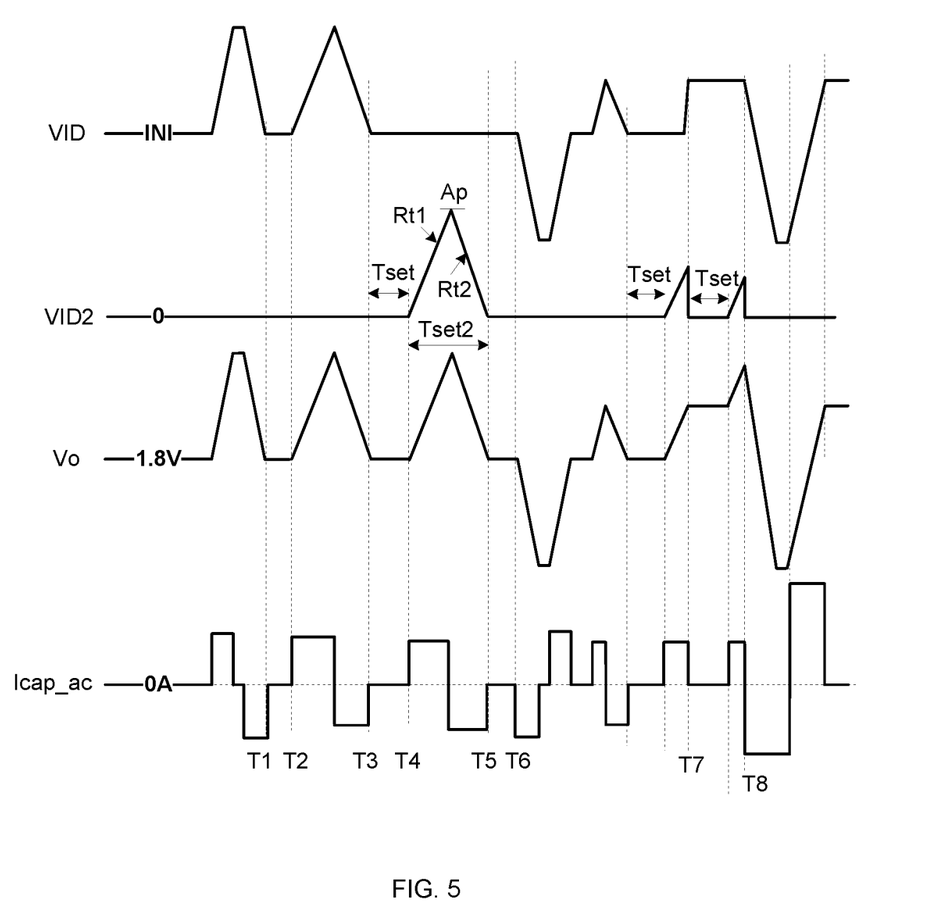
FIG. 5 shows waveforms of the autonomous power system 200 according to another embodiment of the present invention.

FIG. 5 shows waveforms of the power system 200 according to another embodiment of the present invention. Waveforms of which shown in FIG. 5 from top to bottom are: the voltage identification code VID sent by the processor 30, the autonomous voltage identification code VID2, the output voltage Vo and an alternating component Icap_ac of the current Icap flowing through the capacitor C1. In the embodiment as shown in FIG. 5, the voltage identification code VID sent by the processor 30 has an initial value INI, for example, the initial value INI is corresponding to the working voltage 1.8V when the processor 30 is in a normal working mode. An initial value of the autonomous identification code VID2 is zero. At the moment of T1, updating the voltage identification code VID sent by the processor is completed, the output voltage Vo is equal to the target value of the reference voltage Vref, the timer is configured to be reset and then start recording the time. At the moment of T2, the recorded time has not reached the first preset duration Tset, the processor 30 is configured to update the voltage identification code VID, the timer is configured to stop recording the time, and the reference voltage generating circuit 10 is configured to adjust the reference voltage Vref according to the voltage identification code VID sent by the processor 30, thus the output voltage Vo is configured to change. At the moment of T3, updating the voltage identification code VID sent by the processor 30 is completed, the output voltage Vo is equal to the target value of the reference voltage Vref, the timer is configured to be reset and then is configured to start recording the time. At the moment of T4, the recorded time equals to the first preset duration Tset, the autonomous voltage identification code generating module 11 is configured to update the autonomous voltage identification code VID2, the reference voltage generating circuit 10 is configured to adjust the reference voltage Vref according to the sum of the voltage identification code VID and the autonomous identification code VID2. In the embodiment as shown in FIG. 5, the autonomous voltage identification code VID2 is configured to increase to a target value Ap from zero with a first slope Rt1, then the autonomous voltage identification code VID2 is configured to decrease to zero from the target value Ap with a second slope Rt2, wherein the first slope Rt1, the second slope Rt2 and the target value Ap are adjustable. In one embodiment, the first slope Rt1, the second slope Rt2 and the target value Ap are configured to be set to complete updating the autonomous voltage identification code VID2 within a second preset duration Tset2. In one embodiment, the maximum period T5-T3 of the alternating component Icap_ac is equal to a sum (Tset1+Tset2) of the first preset duration Tset1 and the second preset duration Tset2. In one embodiment, the sum (Tset1+Tset2) of the first preset duration Tset1 and the second preset duration Tset2 is less than 50 us. It is configured to control a period of the alternating component Icap_ac not to increase to the audible range, e.g. less than 50 us, by reasonably setting the values of first preset duration Tset, the first slope Rt1, the second slope Rt2 and the target value Ap. In one embodiment, the first slope is equal to the second slope Rt2.

At the moment of T5, updating the autonomous voltage identification code VID2 is completed, both the voltage identification code VID and the autonomous identification code VID2 keep unchanged, the output voltage Vo gets to the target value of the reference voltage Vref, the timer is configured to be reset and then is configured to start recording the time. At the moment of T6, the recorded time has not reached the first preset duration Tset, the processor 30 is configured to update the voltage identification code VID, the timer is configured to stop recording the time, the reference voltage generating circuit 10 is configured to adjust the reference voltage Vref according to the voltage identification code VID sent by the processor 30.

At the moments of T7 and T8, it is configured to stop updating the autonomous identification code VID2 and it is configured to decrease the autonomous identification code VID2 to zero from the current value if the processor 30 is configured to update the voltage identification code VID during the process of updating the autonomous identification code VID2.

Figure 6:
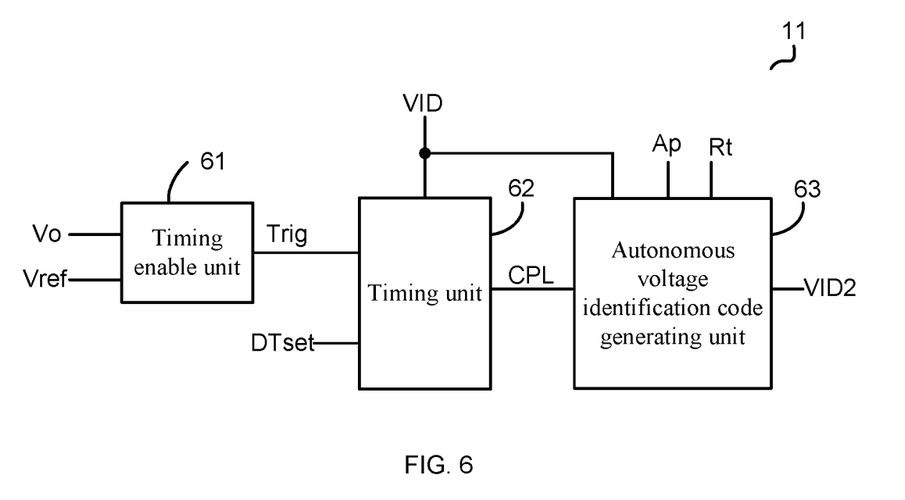
FIG. 6 schematically illustrates an autonomous voltage identification code generating module 11 shown in FIG. 2 according to an embodiment of the present invention.

FIG. 6 schematically illustrates an autonomous voltage identification code generating module 11 shown in FIG. 2 according to an embodiment of the present invention. In the embodiment as shown in FIG. 6, the autonomous voltage identification code generating module 11 comprises a timing enable unit 61, a timing unit 62 and an autonomous voltage identification code generating unit 63. The timing enable unit 61 is configured to provide a timing enable signal Trig according to the output voltage Vo and the reference voltage Vref. The timing unit 62 is configured to receive the timing enable signal Trig and to provide a timing complete indication signal CPL. In one embodiment, when the output voltage Vo is configured to turn into a preset range of the reference voltage Vref, the timing enable signal Trig is configured to control the timing unit 62 to start recording the time. When the recorded time is equal to the first preset duration Tset which is corresponding to the preset value DTset, the timing unit 62 is configured to stop recording the time, the timing complete indication signal CPL is configured to turn over, thus indicating that recording the time is completed. In one embodiment, the timing unit 62 is configured to receive the voltage identification code VID sent by the processor 30, when the voltage identification code VID updates, the timing unit 62 is configured to stop recording the time, the timing complete indication signal CPL is not configured to turn over, thus indicating that recording the time is not completed. The autonomous voltage identification code generating unit 63 is configured to receive the timing complete indication signal CPL, the target value Ap and the slope signal Rt, the autonomous voltage identification code generating unit 63 is configured to provide the autonomous voltage identification code VID2. In one embodiment, when the timing complete indication signal CPL is configured to indicate that recording the time is completed, the autonomous voltage identification code VID2 is configured to increase to the target value Ap with a slope which is corresponding to the slope signal Rt, and is configured to decrease to zero from the target value Ap with the same slope. In one embodiment, the autonomous voltage identification code generating unit 63 is configured to receive the voltage identification code VID sent by the processor 30, when the voltage identification code VID sent by the processor 30 updates, the autonomous identification code VID2 is configured to decrease to zero from the current value directly.

Figure 7:
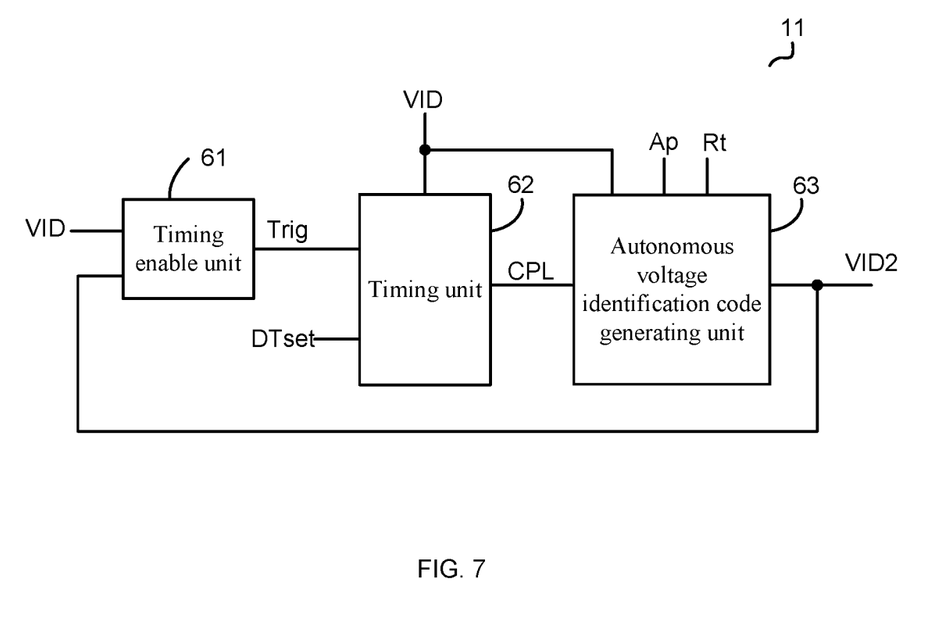
FIG. 7 schematically illustrates an autonomous voltage identification code generating module 11 shown in FIG. 2 according to another embodiment of the present invention.

FIG. 7 schematically illustrates an autonomous voltage identification code generating module 11 shown in FIG. 2 according to another embodiment of the present invention. In the embodiment as shown in FIG. 7, the timing enable unit 61 is configured to provide the timing enable signal Trig according to both the voltage identification code VID and the autonomous voltage identification code VID2. In one embodiment, the timing enable signal Trig is configured to control the timing unit to start recording the time when both the voltage identification code VID and the autonomous identification code VID2 keep unchanged.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control method for a power system, wherein the power system comprises a voltage regulator, the voltage regulator is configured to convert an input voltage to an output voltage, the control method comprising:
   receiving a voltage identification code sent by a processor;
   providing an autonomous voltage identification code according to the voltage identification code sent by the processor, and updating the autonomous voltage identification code when the voltage identification code sent by the processor keeps constant during a first preset duration;
   providing a reference voltage according to both the voltage identification code and the autonomous voltage identification code; and
   adjusting the output voltage according to the reference voltage.

2. The control method of claim 1, further comprising:
   starting recording the time at the moment when the output voltage equals to a target value, wherein the target value is configured to be corresponding to the reference voltage;
   adjusting the reference voltage according to the voltage identification code if the voltage identification code is updated before the recorded time reaches the first preset duration; and
   updating the autonomous voltage identification code within a second preset duration and adjusting the reference voltage according to both the voltage identification code and the autonomous voltage identification code if the recorded time equals to the first preset duration and the voltage identification code sent by the processor keeps constant during the first preset duration.

3. The control method of claim 2, wherein a sum of the first preset duration and the second preset duration is less than 50 us.

4. The control method of claim 1, further comprising: during updating the autonomous voltage identification code, the autonomous voltage identification code is configured to stop being updated and is configured to decrease to zero if the voltage identification code sent by the processor is updated.

5. The control method of claim 1, wherein updating the autonomous identification code comprises:
increasing the autonomous identification code to a target value with a first slope; and
then decreasing the autonomous identification code from the target value with a second slope.

6. The control method of claim 1, wherein providing the reference voltage according to both the voltage identification code and the autonomous voltage identification code comprises:
providing a digital reference voltage signal according to both the voltage identification code and the autonomous voltage identification code; and
converting the digital reference voltage signal to the reference voltage via a Digital-to-Analog Converter (DAC).

7. A power system, comprising:
a reference voltage generating circuit, configured to receive a voltage identification code sent by a processor, and configured to generate an autonomous voltage identification code according to the voltage identification code sent by the processor, the reference voltage generating circuit is configured to provide a reference voltage according to a sum of the voltage identification code and the autonomous voltage identification code; and
a voltage regulator, coupled to the reference voltage generating circuit to receive the reference voltage and to convert an input voltage to an output voltage; wherein
the autonomous voltage identification code is configured to be updated when the voltage identification code keeps constant during a first preset duration.

8. The power system of claim 7, wherein updating the autonomous identification code comprises:
increasing the autonomous voltage identification code to a target value with a first slope; and
then decreasing the autonomous voltage identification code with a second slope once the autonomous voltage identification code equals to the target value; wherein
it is configured to stop updating the autonomous voltage identification code and decrease the autonomous voltage identification code to zero if the voltage identification code sent by the processor is updated during a process of updating the autonomous voltage identification code.

9. The power system of claim 7, further comprising: adjusting the first slope, the second slope and the target value in order to keep an updating duration of the autonomous identification code equal or less than a second preset duration.

10. The power system of claim 7, wherein the reference voltage generating circuit further comprises:
an autonomous voltage identification code generating module, configured to provide the autonomous voltage identification code according to the voltage identification code sent by the processor;
a digital reference voltage generating module, configured to provide a digital reference voltage signal according to the sum of the voltage identification code and the autonomous voltage identification; and
a Digital-to-Analog Converter (DAC), configured to convert the digital reference voltage signal to the reference voltage.

11. The power system of claim 10, wherein the autonomous voltage identification code generating module further comprises:

a timing enable unit, configured to provide a timing enable signal according to the output voltage;
a timing unit, configured to receive the timing enable signal and the voltage identification code sent by the processor, configured to provide a timing complete indication signal, configured to start recording the time when the output voltage enters into a preset range, configured to stop recording the time when the voltage identification code sent by the processor is updated, and the timing complete indication signal is configured to indicate that a process of recording the time is completed once the recorded time equals to a first preset duration; and
an autonomous voltage identification code generating unit, configured to receive the timing complete signal, the voltage identification code sent by the processor, the target value and a slope signal, configured to provide the autonomous voltage identification code, wherein the autonomous voltage identification code is configured to increase to the target value with a slope which is corresponding to the slope signal once the timing complete indication signal indicates that a process of recording the time is completed, then the autonomous voltage identification code is configured to decrease to zero with the same slope, and the autonomous voltage identification code is configured to decrease to zero from a current value directly if the voltage identification code sent by the processor is updated.

12. A control method for a power system, wherein the power system comprises a voltage regulator configured to convert an input voltage to an output voltage according to a reference voltage, the control method comprising:
receiving a voltage identification code sent by a processor;
providing an autonomous voltage identification code, wherein the autonomous voltage identification code is configured to be altered when the voltage identification code sent by the processor keeps constant during a preset duration;
providing the reference voltage according to a sum of the voltage identification code and the autonomous voltage identification code; and
adjusting the output voltage according to the reference voltage.

13. The control method of claim 12, wherein providing the autonomous voltage identification code comprises:
increasing the autonomous voltage identification code to a target value with a first slope; and
then decreasing the autonomous voltage identification code from the target value with a second slope; wherein
the autonomous voltage identification code is configured to decrease to zero directly if the voltage identification code sent by the processor is updated during a process of updating the autonomous voltage identification code.

14. A control method of claim 13, further comprising:
starting recording the time at the moment when the output voltage enters into a preset range;
stop recording the time if the voltage identification code sent by the processor is updated before the recorded time reaches a preset duration; and
updating the autonomous voltage identification code when the recorded time equals to the preset duration and the voltage identification code sent by the processor keeps constant.

15. A control method of claim 13, further comprising:
starting recording the time at the moment when both the voltage identification code and the autonomous voltage identification code are constant;
stop recording the time when the voltage identification sent by the processor is updated before the recorded time reaches the preset duration; and
updating the autonomous voltage identification code when the recorded time equals to the preset duration and the voltage identification code sent by the processor keeps constant during the preset duration.

\* \* \* \* \*